United States Patent [19]

Smith et al.

[11] Patent Number: 5,208,110

[45] Date of Patent: May 4, 1993

[54] SECURITY CARDS

[75] Inventors: Terence J. Smith, Royston; Edward Irving, Burwell, both of England

[73] Assignee: Ciba-Geigy Corporation, Ardsley, N.Y.

[21] Appl. No.: 368,452

[22] Filed: Jun. 19, 1989

[30] Foreign Application Priority Data

Jun. 21, 1988 [GB] United Kingdom ............... 8814705

[51] Int. Cl.$^5$ ..................... B32B 27/38; D21H 5/10
[52] U.S. Cl. .................... 428/414; 428/476.6; 428/478.4; 428/478.8; 428/480; 428/915; 428/916; 428/412; 428/423.7; 428/424.4; 428/516; 428/205; 428/913; 156/330; 430/10
[58] Field of Search ............ 428/414, 476.6, 478.4, 428/478.8, 480, 915, 916, 516, 205, 514, 913; 156/330

[56] References Cited

U.S. PATENT DOCUMENTS

| | | | |
|---|---|---|---|
| 3,125,455 | 3/1964 | Perkins | 428/478.8 X |
| 3,623,944 | 11/1971 | Davis | 428/915 X |
| 4,389,472 | 6/1983 | Neuhaus et al. | 430/10 |
| 4,455,359 | 6/1984 | Patzold et al. | 430/10 |
| 4,788,102 | 11/1988 | Koning et al. | 428/915 X |

FOREIGN PATENT DOCUMENTS 1435686  5/1976  United Kingdom ............... 428/915

OTHER PUBLICATIONS

Patent Abstracts of Japan vol. 11 No. 32.

Primary Examiner—P. C. Sluby
Attorney, Agent, or Firm—JoAnn Villamizar

[57] ABSTRACT

A security card comprises a data-carrying sheet having a gelatin layer thereon and a transparent polymeric film having a gelatin layer thereon, said sheet and said film being bonded together by an adhesive composition polymerized between and in contact with the gelatin layers, the adhesive composition comprising a carboxylic acid having at least one polymerizable acrylic group.

20 Claims, No Drawings

SECURITY CARDS

This invention relates to security cards such as identity cards or credit cards produced by bonding a transparent film to a data carrying sheet such as photographic paper bearing a photographic print.

Security cards such as identity cards and credit cards conventionally comprise a data-carrying sheet of, for example, paper or card, protected by a layer of a transparent plastics material. The latter is usually applied to the data-carrying sheet by a laminating process. The plastics material is usually a thermoplastic material and adhesion between the data-carrying sheet and the plastics material is obtained either by the use of a hot-melt adhesive or by relying on melting of the surface of the plastics material during the laminating process. These conventional methods of effecting adhesion between the data-carrying sheet and the plastics material have not proved satisfactory because after heating these layers of the card can be delaminated without destroying the data-carrying sheet. It has now been found that by using a data-carrying sheet having a gelatin layer thereon and a transparent protective plastics film also having a gelatin layer thereon, and bonding the gelatin layers using a polymerizable adhesive comprising a carboxylic acid having a polymerizable acrylic group, a security card having excellent adhesion between the component layers thereof can be obtained.

Accordingly, the present invention provides a security card comprising a data-carrying sheet having a gelatin layer thereon and a transparent polymeric film having a gelatin layer thereon, said sheet and said film being bonded together by an adhesive composition polymerized between and in contact with the gelatin layers, the adhesive composition comprising a carboxylic acid having at least one polymerizable acrylic group.

Carboxylic acids having a polymerisable acrylic group suitable for use in producing cards of the invention include reaction products of polycarboxylic acid anhydrides, such as succinic, glutaric, maleic, phthalic or trimellitic anhydride, with compounds having a hydroxyl group and at least one polymerisable acrylic group. Such hydroxyl compounds may be esters of acrylic or methacrylic acid with a monoepoxide such as an alkylene oxide (when the esters are hydroxyalkyl (meth)acrylates) or a monoglycidyl ether, e.g. iso-octyl glycidyl ether or phenyl glycidyl ether or an epoxide resin such as a diglycidyl ether of a dihydric alcohol or of a bisphenol or a polyglycidyl ether of a phenolic novolac resin. Other suitable polymerisable carboxylic acids are reaction products of glycidyl acrylate, glycidyl methacrylate, acryloyl chloride or methacryloyl chloride and secondary hydroxyl group-containing carboxyl-terminated adducts of an epoxide resin such as a diglycidyl ether of a dihydric alcohol or of a bisphenol with a dicarboxylic acid such as succinic, glutraric, adipic, maleic, hexahydrophthalic or phthalic acid.

Preferred polymerisable carboxylic acids are monoacrylic compounds having from 3 to 30 carbon atoms. Such monoacrylic compounds include acrylic acid, methacrylic acid, a dimer or other oligomer of acrylic or methacrylic acid and reaction products of a hydroxyalkyl acrylate or a hydroxyalkyl methacrylate, such as 2-hydroxyethyl methacrylate or 2-hydroxypropyl acrylate, with a polycarboxylic acid anhydride such as succinic, glutaric, maleic, hexahydrophthalic, phthalic or trimellitic anhydride. Preferred such monoacrylic compounds are those of formula $$CH_2=C(R^1)-COOR^2 \qquad I$$

where
$R^1$ denotes a hydrogen atom or a methyl group,
$R^2$ denotes a hydrogen atom or a group of formula —$R^3$—COOH and
$R^3$ denotes an alkylene group of 1 to 4 carbon atoms or a group of formula $$-(CH_2-CH(R^1)COO)_nCH_2CH(R^1)- \qquad II$$

where n denotes an integer from 1 to 6.

The polymerisable carboxylic acids are either commercially available or may be prepared by conventional reactions. For example, acids of formula I where $R^2$ denotes —$R^3$—COOH and $R^3$ denotes a group of formula II can be prepared by oligomerisation of acrylic or methacrylic acid.

Especially preferred polymerisable carboxylic acids of formula I are those where $R^1$ denotes a hydrogen atom and $R^2$ denotes a hydrogen atom or a group of formula —$CH_2CH_2COOH$, or where $R_1$ denotes a methyl group and $R^2$ denotes a hydrogen atom or a group of formula —$CH_2CH(CH_3)COOH$, that is acrylic acid, 2-carboxyethyl acrylate, methacrylic acid and 2-carboxy-2-methylethyl methacrylate. 2-carboxyethyl acrylate is commercially available as a product prepared by dimerisation of acrylic acid, containing 90 by weight of 2-carboxyethyl acrylate and 10% by weight of higher oligomers.

Other preferred polymerisable carboxylic acids are compounds having 2 acrylic groups and 1 or 2 carboxyl groups, these compounds generally having from 14 to 70 carbon atoms. Preferred diacrylic monocarboxylic acids are those of formula

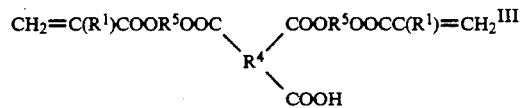

where
$R^1$ denotes a hydrogen atom or a methyl group,
$R^4$ denotes a trivalent organic residue of a tricarboxylic acid after removal of three carboxyl groups, generally of 3 to 30 carbon atoms, preferably a cycloaliphatic or aromatic residue of 5 to 20 carbon atoms, and
$R^5$ denotes an alkylene group of 1 to 10 carbon atoms, preferably 1 to 4 carbon atoms.

The diacrylic monocarboxylic acids are usually reaction products of an acyl halide of a tricarboxylic acid monoanhydride, e.g. of formula

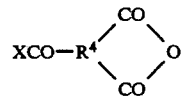

with a hydroxyalkyl acrylate or methacrylate, e.g. of formula $$CH_2=C(R^1)COOR^5OH \qquad V$$

where $R^1$, $R^4$ and $R^5$ as defined in formula III and X denotes a halogen atom, preferably a chlorine atom.

Suitable acyl halides of tricarboxylic acid monoanhydrides from which such reactions products may be derived include acyl halides of monoanhydrides of cycloaliphatic tricarboxylic acids such as cyclopentane 1,2,4-tricarboxylic acid and cyclohexane 1,2,4-tricarboxylic acid and, preferably, acyl halides of monoanhydrides of aromatic tricarboxylic acids such as naphthalene-1,2,4-, 1,2,5-, 1,2,6-, 1,2,7-, 1,4,5-, 1,3,8- and 2,3,6-tricarboxylic acids and, especially, trimellitic acid. The acyl halides may be obtained from the tricarboxylic acid monoanhydrides by conventional reactions, for example by heating with thionyl chloride. Suitable hydroxyalkyl acrylates and methacrylates include 2-hydroxyethyl acrylate, 2-hydroxypropyl acrylate, 3-hydroxypropyl acrylate, hydroxybutyl acrylates and the corresponding methacrylates.

Especially preferred diacrylic monocarboxylic acids are reaction products of 2-hydroxyethyl acrylate or methacrylate with the acid chloride of trimellitic anhydride, that is acids of formula 111 where $R^4$ denotes a benzene-1,2,4-triyl group and $R^5$ denotes an ethylene group.

Preferred diacrylic dicarboxylic acids are those of formula

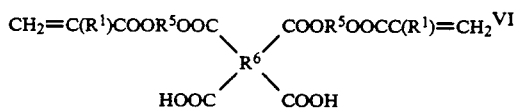

where
$R^1$ and $R^5$ are as defined in formula III, and
$R^6$ denotes a tetravalent organic residue of a tetracarboxylic acid after removal of four carboxyl groups, generally of 5 to 30 carbon atoms, preferably a cycloaliphatic or aromatic residue of 5 to 20 carbon atoms.

The diacrylic dicarboxylic acids are usually reaction products of a dianhydride of a polycarboxylic acid, e.g. of formula

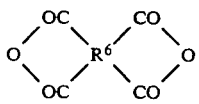

with a hydroxyalkyl acrylate or methacrylate, e.g. of formula V.

Suitable dianhydrides from which such reaction products may be derived include those of cycloaliphatic tetracarboxylic acids such as cyclopentane-1,2,4,5-tetracarboxylic acid and, preferably, aromatic tetracarboxylic acids such as benzophenone-3,3',4,4'-tetracarboxylic acid, pyremellitic acid and naphthalene-2,3,6,7-tetracarboxylic acid. Suitable hydroxyalkyl acrylates and methacrylates include 2-hydroxyethyl acrylate, 2-hydroxypropyl acrylate, 3-hydroxypropyl acrylate, hydroxybutyl acrylates and the corresponding methacrylates.

Especially preferred diacrylic dicarboxylic acids are reaction products of benzophenone-3,3',4,4'-tetracarboxylic acid dianhydride with 2-hydroxyethyl acrylate or methacrylate, that is acids of formula VI where $R^5$ denotes an ethylene group and $R^6$ denotes a benzophenone-3,3',4,4'-tetrayl group.

The reaction of a compound of formula IV or VII with a compound of formula V may be carried out using conventional procedures for anhydride-hydroxyl reactions. Conveniently the reactants are heated together, optionally in an inert solvent, in the presence of a catalyst such as a tertiary amine or a quaternary ammonium salt.

When, as in preferred embodiments of the invention, a monoacrylic compound is used as the polymerisable carboxylic acid, the adhesive composition preferably also contains a polyfunctional material, having, on average, more than one polymerisable acrylic group per molecule. Suitable such polyfunctional materials include acrylates and methacrylates of polyhydric alcohols such as ethylene glycol diacrylate, triethylene glycol diacrylate, dipropylene glycol diacrylate, tripropylene glycol diacrylate, butanediol-1,4-diacrylate, pentamethylene glycol diacrylate, neopentyl glycol diacrylate, hexamethylene glycol diacrylate, 1,1,1-trimethylolpropane triacrylate, pentaerythritol tetraacrylate and corresponding methacrylates. Other suitable polyfunctional materials are reaction products of hydroxyalkyl acrylates or methacrylates with isocyanate-terminated prepolymers derived from polyols and polyisocyanates.

Preferred polyfunctional materials are esters of epoxide resins with carboxylic acids having a polymerisable acrylic group. Such acids include acrylic acid, methacrylic acid, dimers of acrylic acid and methacrylic acid, and adducts of hydroxyalkyl acrylates or methacrylates such as 2-hydroxyethyl methacrylate or 2-hydroxypropyl acrylate with polycarboxylic acid anhydrides such those hereinbefore mentioned. Esters of epoxide resins with acrylic or methacrylic acid are preferred.

When a diacrylic compound is used as the polymerisable carboxylic acid, the adhesive composition may contain, as an additional component to achieve the desired viscosity, another acrylic material which is a polyfunctional material having, on average, more than one polymerisable acrylic group per molecule as hereinbefore described.

Epoxide resins from which the esters may be derived include those having at least two glycidyl groups attached to an atom or atoms of oxygen, nitrogen or sulphur, and cycloaliphatic epoxide resins in which the epoxide group is part of the ring system. The polyglycidyl compounds may be polyglycidyl esters of aliphatic, cycloaliphatic or aromatic polycarboxylic acids such as adipic, succinic, hexahydrophthalic and phthalic acids, and poly-(N-glycidyl) compounds, for example poly(N-glycidyl) derivatives of aromatic amines such as aniline and bis(4-aminophenyl)methane and hydantoins such as 5,5-dimethylhydantoin. Preferred epoxide resins are polyglycidyl ethers, which may have been advanced, of polyhydric alcohols or phenols, including polyglycidyl ethers of the polyhydric alcohols and polyhydric phenols mentioned above. Preferred polyglycidyl ethers are diglycidyl ethers, which may be have been advanced, of dihydric alcohols and phenols, such as 1,4-butanediol, polyoxyalkylene glycols and bisphenols, and polyglycidyl ethers of phenol-aldehyde novolaks. Especially preferred polyglycidyl ethers are diglycidyl ethers, which may have been advanced, of dihydric alcohols having from 2 to 60 carbon atoms, or of bis(4-hydroxyphenyl)methane, 2,2-bis(4-hydroxyphenyl)propane or 2,2-bis(3,5-dibromo-4-hydroxyphenyl)propane, or polyglycidyl ethers of novolaks derived from phenol and formaldehyde. The esters of epoxide resins may be prepared by conventional procedures, for example by reacting the carboxylic acid having a polymerisable acrylic group, preferably acrylic or methacrylic acid, with the epoxide resin in the presence of a tertiary amine, a transition metal salt of a saturated carboxylic acid or an onium salt. Preferably, the epoxide resin is also esterified with a saturated monocarboxylic acid having from 6 to 20 carbon atoms, preferably lauric acid, octanoic acid or nonanoic acid.

This esterification may be carried out before, simultaneously with or after the esterification with the carboxylic acid having an acrylic group. Thus particularly preferred adhesive compositions contain an ester of an epoxy de resin with the carboxylic acid having a polymerisable acrylic group and an ester of the epoxide resin with the saturated monocarboxylic acid having from 6 to 20 carbon atoms.

In adhesive compositions containing a mixture of a polymerisable carboxylic acid and a polyfunctional material, having, on average, more than one polymerisable acrylic group per molecule, the weight ratio of carboxylic acid to polyfunctional material is generally from 1:5 to 19:1, preferably from 1:1.5 to 10:1, and especially from 1:1 to 5:1.

The flexibility of the polymerised adhesive may be improved, when desired, by including in the adhesive composition a flexible polymer, preferably an elastomeric polymer. Flexibilising elastomeric polymers are well known in the adhesives art, including polymers of conjugated dienes such as butadiene and isoprene, which may be homopolymers or copolymers with other ethylenically unsaturated materials, particularly styrene, substituted styrenes and acrylic monomers such as acrylonitrile, alkyl acrylates and alkyl methacrylates. These diene polymers may have terminal functional groups such as amino, carboxyl or vinyl groups. Eleastomeric polymers which have been found to be particularly suitable for use in the cards of the invention are vinyl terminated butadiene-acrylonitrile copolymers, preferably those having a molecular weight of at least 500. The weight ratio of carboxylic acid to elastomeric polymer is generally from 1:3 to 19:1, preferably from 1:1.5 to 5:1 and especially from 1:1 to 2:1.

The adhesive composition may be liquid (including pastes) or solid, depending on the nature of its ingredients and their relative amounts. When the composition is liquid, it may be applied directly to one or both of the surfaces to be bonded. When it is solid, it may be applied, to one or both of the surfaces to be bonded, in solution in a volatile solvent and the solvent then evaporated before the surfaces to be bonded are brought together. A solid adhesive composition may alternatively be applied to one or both of the surfaces in molten form. In a further alternative, a solid adhesive composition may be used in the form of a preformed film. Such a film can be produced in a conventional manner. Thus it may be cast onto a release surface such as silicone-treated paper from a solution of the composition in a volatile solvent or may be formed without the use of solvents by subjecting the solid composition to heat and pressure under conditions which do not induce polymerisation. The film-forming properties of the adhesive composition can be improved by the inclusion of a film-forming polymer such as an acrylic homopolymer or copolymer, a phenoxy resin, a high molecular weight or advanced epoxide resin or, preferably, a polyurethane, particularly an isocyanate-terminated prepolymer derived from a bisphenol and a polyisocyanate and having a molecular weight from 400 to 10,000.

Polymerisation of the adhesive composition may be effected by subjecting it to ionising radiation such as electron beam or X-ray radiation. For such polymerisation, as is well understood, an initiator is not necessary although a free radical initiator can be included in the composition to accelerate polymerisation.

When it is desired to partially or completely polymerise the adhesive composition by subjection to photopolymerising radiation such as ultraviolet, laser beam or short wavelength visible radiation, a photopolymerisation initiator for acrylic groups is included in the composition. This can be any of the known initiators for the photopolymerisation of acrylic materials, used in a conventional amount, generally from 0.1 to 20%, preferably 1 to 10%, by weight of the polymerisable acrylic material. Thus the photopolymerisation initiator may be an aromatic carbonyl compound, for example a benzoin, a benzoin alkyl ether such as the isopropyl or n-butyl ether, an alpha-substituted acetophenone, for example a benzil ketal such as benzil dimethyl ketal, an alphahaloacetophenone such as trichloromethyl p-tert-.butylphenyl ketone, an alpha-aminoacetophenone such as dimethylaminomethyl phenyl ketone and morpholinomethyl phenyl ketone, a dialkyloxyacetophenone such as diethoxyacetophenone, or an alphahydroxyacetopheone such as 1-hydroxycyclohexylphenyl ketone or a benzophenone such as benzophenone itself and bis(4-dimethylamino)benzophenone; a metallocene, for example a titanium metallocene such as bis(pi-methylcyclopentadienyl)bis(sigma-pentafluorophenyl)-titanium (IV); a Group IVA organometallic compound, for example a stannane such as trimethyl benzyl stannane, tributyl benzyl stannane or dibutyl dibenzyl stannane, together with a photoreducible dye, typically methylene blue or rose bengal; a quinone, such as anthraquinone or camphorquinone, together with an amine having hydrogen attached to an aliphatic alpha carbon atom, preferably a tertiary amine such as bis(4-dimethylamino)benzophenone and triethanolamine; a thioxanthone, for example an alkyl- or halogen-substituted thioxanthone such as 2-isopropylthioxanthone or 2-chlorot-hioxanthone; an acyl phosphine oxide; or a mixture of two or more thereof.

Preferably, the photopolymerisation initiator is an alpha-substituted acetophenone, a thioxanthone, a metallocene or a mixture of two or more thereof. In particularly preferred embodiments, the initiator is a benzil dialkyl ketal, an alkylsubstituted thioxanthone or a mixture of two or more thereof.

The adhesive composition containing a photopolymerisation initiator may be polymerised by subjection to photopolymerising radiation. When the composition also contains a free radical polymerisation initiator, it can be polymerised by subjecting it to photopolymerising radiation to effect partial polymerisation followed by free radical polymerisation to complete the polymerisation.

Photopolymerising radiation suitable for use in producing the cards of the invention may be exclusively ultraviolet radiation or it may be radiation having wavelengths in both the ultraviolet and visible regions of the spectrum. Radiation having a wavelength of 200 to 800 nm, especially 200 to 500 nm, is preferred. The selection, from commercially available equipment, of a suitable radiation source emitting radiation within this wavelength range is a routine matter for those skilled in the art of photopolymerisation. Suitable sources include medium pressure mercury arc lamps and metal halide lamps. Suitable irradiation times may similarly be determined readily by those familiar with photopolymerisation techniques.

Photopolymerising radiation can be used to effect polymerisation of the adhesive composition by irradiating the assembly of data-carrying sheet and transparent polymeric film, with the adhesive composition sandwiched therebetween, through the transparent polymeric film. When the data-carrying sheet is also transparent to such radiation, polymerisation can be effected by irradiating the assembly through this sheet.

When the adhesive composition is to be polymerised by means of free radicals, either directly or after subjection to photopolymerising radiation, it contains a free radical polymerisation initiator. This can be any of the known free radical-generating initiators conventionally used in vinyl polymerisation and is preferably an organic peroxide or azo compound. The initiators can be used in conventional amounts, generally from 0.01 to 15%, preferably 0.05 to 10%, by weight of the polymerisable material. Suitable organic peroxides include dialkyl peroxides such as tert. butyl peroxide and 2,2-bis(-tert.butylperoxy)propane, diacyl peroxides such as benzoyl peroxide and acetyl peroxide, peresters such as tert.butyl perbenzoate and tert.butyl per-2-ethylhexanoate, perdicarbonates such as dicetyl peroxy dicarbonate and dicyclohexyl peroxy dicarbonate, ketone peroxides such as cyclohexanone peroxide and methylethylketone peroxide, and hydroperoxides such as cumene hydroperoxide and tert.butyl hydroperoxide. Suitable azo compounds include azo bis(isobutyronitrile) and azo bis(2,4-dimethylvaleronitrile). Accelerators of free radical polymerisation, for example tertiary amines, ketimines, transition metal salts such as cobalt naphthenate and vanadium monobutyl phosphite and sulphimides, may be used together with the initiators.

As is well understood in the art of acrylic polymerisation, appropriate choice of free radical initiator and accelerator can give adhesive compositions which undergo free radical polymerisation under ambient conditions, although their polymerisation can be accelerated by heating. For such compositions, subjection to polymerising conditions requires simply allowing them to polymerise under ambient conditions after confinement between the surfaces to be bonded. Preferably in accordance with the present invention, free radical polymerisation is effected by heating, which can be to only moderately elevated temperatures. Suitable temperatures are generally from 30 to 150° C, preferably from 80 to 130° C.

The adhesive composition may also contain conventional additives, for example polymerisation inhibitors such as hydroquinone and 2,6-di-tert.butyl-4-methylphenol and fillers to formulate the composition as a paste. Of course, when the composition is to be polymerised by exposure to radiation, the filler should be sufficiently transparent to the radiation used that it does not prevent polymeristion. Selection of a suitable filler is a routine matter for those skilled in the art of radiation polymerisation.

The transparent polymeric film may be, for example, of a polyethylene, a copolymer of ethylene and vinyl acetate, a polyester, a polymer of methyl methacrylate, a polystryene, a polycarbonate or a cellulose acetate. Preferred films are of a polyester or a cellulose triacetate. The gelatin layer may be formed on the film by evaporation of water from an aqueous gelatin emulsion deposited on the film. Alternatively, the transparent polymeric film having a gelatin layer thereon may be a laminate of the polymeric film and a preformed gelatin layer.

The data-carrying sheet may be, for example, a sheet of paper, the paper comprising cellulosic fibres and/or synthetic polymeric fibres such as polyester, polyamide or polyolefin fibres, or a non-fibrous sheet of a polymeric material such as those hereinbefore described as suitable for the protective transparent polymeric film. The data carried by the sheet may comprise a photograph of, for example, the person to whom the card is to be issued or may be other printed pictorial or alphanumerical data. The gelatin layer on the data-carrying sheet is generally formed by evaporation of water from an aqueous gelatin emulsion deposited on the sheet.

The data-carrying sheet may have a gelatin layer on one face only thereof when, for example, security data is carried on that face only. More usually, the data-carrying sheet has a gelatin layer on each face and a transparent polymeric film as hereinbefore described is bonded to each face.

In producing the cards of the invention, the adhesive composition may be applied to the gelatin layer on the transparent polymeric film, to the gelatin layer on the data-carrying sheet, or to both of these layers. After application of the adhesive composition, the transparent polymeric film and the data-carrying sheet may be pressed together, with the adhesive composition sandwiched between them, for example in a laminating apparatus such as a laminating apparatus conventionally used in the production of security cards. It is usually desirable that the substrates to be bonded should be pressed together using a pressure sufficient to ensure that any air trapped between them is expelled. The resulting assembly is then subjected to polymerising conditions for the adhesive composition, for example by irradiating the assembly with photopolymerising radiation as hereinbefore described.

The invention is particularly suitable when applied to identity cards.

The invention is illustrated by the following Examples in which parts and percentages are by weight unless stated otherwise.

The resin used in the Examples is prepared as follows:

RESIN I

A mixture of a diglycidyl ether of bisphenol A having an epoxide equivalent of 5.2 equivalents/kg (400 parts) and 2,6-di-tert.butyl-4-methylphenol (0.4 part) is heated to 110° C. While maintaining this temperature there is added over a period of 2.5 hours a mixture of methacrylic acid (164 parts), nonanoic acid (15 parts), chromium 111 trisoctanoate (0.4 part; 5% solution in ligroin) and 2,6-di-tert.butyl-4-methylphenol (1.2 parts). After heating for a further 3 hours at 110° C., the epoxide content is 0.36 equivalent/kg.

EXAMPLE 1

A stiff photographic paper bearing a photographic print and having a gelatin surface layer is coated on the gelatin layer with an adhesive composition consisting of 2-carboxyethyl acrylate (73.3 parts), Resin 1 (18.3 parts), benzil dimethyl ketal (2.7 parts) and a silica filler (5.7 parts). The adhesive composition is applied as a coating 25 micrometres thick using a wire wound bar. A transparent polyester film having a gelatin layer thereon (total thickness 175 micrometres) is applied, gelatin layer facing downwards, on top of the adhesive-coated surface of the photographic paper. Hand pressure is applied to the resulting assembly, which is then irradiated through the transparent film by photopolymerising radiation from a 80w/cm medium pressure mercury arc lamp at a distance of 750 mm for 2 seconds. A totally secure bond is formed between the polyester film and the photographic paper, so that on attempting to remove the polyester film the photographic paper is destroyed.

EXAMPLE 2

Example 1 is repeated, except that a transparent cellulose triacetate film having a gelatin layer thereon (total thickness 200 micrometres) is used in place of the polyester film used in Example 1 and, after applying the transparent film to the adhesive-coated photographic paper, the assembly is rolled to remove any entrapped air and placed in a vacuum chamber before irradiation as described in Example 1 for 2 seconds. A totally secure bond is formed, so that on attempting to remove the cellulose triacetate film the photographic paper is destroyed.

What is claimed is:

1. A security card comprising a data-carrying sheet having a gelatin layer thereon and a transparent polymeric film having a gelatin layer thereon, said sheet and said film being bonded together by an adhesive composition polymerized between and in contact with the gelatin layers, the adhesive composition comprising a carboxylic acid having at least one polymerizable acrylic group.

2. A card according to claim 1, in which the carboxylic acid is a monoacrylic compound having from 3 to 30 carbon atoms.

3. A card according to claim 2, in which the carboxylic acid is of formula $$CH_2=C(R^1)-COOR^2 \qquad I$$

where
R$^1$ denotes a hydrogen atom or a methyl group,
R$^2$ denotes a hydrogen atom or a group of formula —R$^3$—COOH, and
R$^3$ denotes an alkylene group having 1 to 4 carbon atoms or a group of formula $$-(CH_2-CH(R^1)COO)_nCH_2CH(R^1)- \qquad II$$

where n denotes an integer of from 1 to 6.

4. A card according to claim 3, in which R$^1$ denotes a hydrogen atom and R$^2$ denotes a hydrogen atom or a group of formula —CH$_2$CH$_2$COOH, or R$^1$ denotes a methyl group and R$^2$ denotes a hydrogen atom or a group of formula —CH$_2$CH(CH$_3$)COOH.

5. A card according to claim 1, in which the adhesive composition also contains a further acrylic material which is a polyfunctional material having, on average, more than one polymerizable acrylic group per molecule.

6. A card according to claim 3, in which the adhesive composition also contains a further acrylic material which is a polyfunctional material having, on average, more than one polymerizable acrylic group per molecule.

7. A card according to claim 5, in which the polyfunctional material is an ester of an epoxide resin with a carboxylic acid having a polymerizable acrylic group.

8. A card according to claim 6, in which the polyfunctional material is an ester of an epoxide resin with a carboxylic acid having a polymerizable acrylic group.

9. A card according to claim 7, in which the polyfunctional material is an ester of an epoxide resin with acrylic or methacrylic acid.

10. A card according to claim 8, in which the polyfunctional material is an ester of an epoxide resin with acrylic or methacrylic acid.

11. A card according to claim 7, in which the adhesive composition also contains an ester of the epoxide resin with a saturated monocarboxylic acid having from 6 to 20 carbon atoms.

12. A card according to claim 8, in which the adhesive composition also contains an ester of the epoxide resin with a saturated monocarboxylic acid having from 6 to 20 carbon atoms.

13. A card according to claim 1, in which the adhesive composition contains a mixture of the carboxylic acid and a polyfunctional material having, on average, more than one polymerizable acrylic group per molecule, the weight ratio of carboxylic acid to polyfunctional material being from 1:1.5 to 10:1.

14. A card according to claim 1, in which the adhesive composition also contains a photopolymerization initiator for the acrylic group and is polymerized by subjection to photopolymerizing radiation.

15. A card according to claim 14, in which the adhesive composition also contains a free radical polymerization initiator and is polymerized by subjection to photopolymerizing radiation followed by free radical polymerization.

16. A card according to claim 1, in which the adhesive composition also contains a free radical polymerization initiator and is polymerized by free radical polymerization.

17. A card according to claim 1, in which the transparent polymeric film is of a polyester or a cellulose triacetate.

18. A card according to claim 1, in which the data-carrying sheet is a sheet of paper.

19. A card according to claim 1, in which the data-carrying sheet has a gelatin layer on each face and a transparent polymeric film as specified in claim 1 is bonded to each face.

20. A card according to claim 1, obtained by pressing the transparent polymeric film and the data-carrying sheet together, with the adhesive composition sandwiched between them, in a laminating apparatus.

* * * * *